United States Patent [19]

Ohe

[11] Patent Number: 4,729,068
[45] Date of Patent: Mar. 1, 1988

[54] LIGHT DIFFUSING DEVICE

[75] Inventor: Makoto Ohe, Tokyo, Japan

[73] Assignee: Mitsubishi Rayon Company Ltd., Tokyo, Japan

[21] Appl. No.: 917,533

[22] Filed: Oct. 10, 1986

[51] Int. Cl.$^4$ ............................ F21V 7/04; G02B 26/02
[52] U.S. Cl. .......................................... 362/31; 362/26; 362/277; 40/448; 350/321
[58] Field of Search ........................ 362/31, 26; 40/448, 40/435, 546; 350/321, 3.81, 345

[56] References Cited

U.S. PATENT DOCUMENTS

| | | | |
|---|---|---|---|
| 2,358,203 | 9/1944 | Best | 362/31 |
| 3,131,496 | 5/1964 | Schropp | 362/31 |
| 3,586,851 | 6/1971 | Rudolph | 362/277 X |
| 4,053,206 | 10/1977 | Yevick | 362/31 |
| 4,415,509 | 11/1983 | Toyooka et al. | |
| 4,648,690 | 3/1987 | Ohe | 40/448 X |

Primary Examiner—Larry Jones
Attorney, Agent, or Firm—Oblon, Fisher, Spivak, McClelland & Maier

[57] ABSTRACT

A light diffusing device useful for evenly illuminating a relatively large area comprises (1) a light source member and (2) a light diffusing member comprising (A) a base plate having (a) a transparent light transmitting layer with at least one light incident edge face thereof, (b) a light diffusing layer formed on the front surface of the transparent light transmitting layer, (c) an intermediate layer formed between the transparent light transmitting layer and the light diffusing layer, and (d) a light reflecting surface layer formed on a rear surface of the transparent light transmitting layer; (B) a light diffusing plate superimposed over the base plate; and (C) a light reflecting film arranged between the base plate and the light diffusing plate and effective for evenly distributing light irradiated from the light diffusing layer into the light diffusing plate.

7 Claims, 7 Drawing Figures

LIGHT DIFFUSING DEVICE

BACKGROUND OF THE INVENTION

1. Field of the Invention

The present invention relates to a light diffusing device. Particularly, the present invention relates to an improved light diffusing device useful for every illuminating a relatively large area at a significantly reduced optical loss.

2. Description of the Related Art

Various known light diffusing devices are useful as a plane light source for transmitting light received from a light source to a desired object to evenly illuminate a relatively large area. These light diffusing devices are practically employed as an illumination means for display devices, for example, advertising display devices, and further, as rear face illumination means for liquid crystal display devices.

Also, various known light diffusing plates, for example, frosted glass plates and milk (opal) white glass plates, are used for light diffusion. The light diffusing plates are usually utilized in such a manner that a light source is located by and spaced from a rear surface of the light diffusing plate at a predetermined distance.

In recent types of liquid crystal display devices, however, it has been attempted to arrange the light source in the vicinity of an edge face of a light diffusing plate which has been utilized as a light incident face, to minimize the size of the display devices. In this attempt, it has been found that, where the light source is merely arranged at the edge face of the usual light diffusing plate, for example, a frosted glass plate or milk white glass plate, it fails to evenly illuminate the entire surface of the light diffusing plate.

To eliminate the above-mentioned disadvantage, U.S. Pat. No. 4,059,916 discloses a concept wherein a rear surface of a light transmitting plate is matted (roughed) in a hairline mode and a light reflecting layer is formed on the mat rear surface so that light irradiated from a light source can be transmitted through the light diffusing plate in an enhanced directivity, and the thickness of the light transmitting plate is gradually decreased from the edge face facing the light source toward the opposite edge face of the plate, so that the brightness at the opposite edge face of the plate is increased and, thus, the brightness throughout the entire surface of the plate becomes uniform.

The above-mentioned type of light diffusing plate is, however, disadvantageous in that the production of the light diffusing plate can be attained only by very fine, delicate and precise work on a surface of a transparent light transmitting plate, and this work causes an extreme increase in the production cost. This is disadvantageous since, from a commercial viewpoint, the cost for producing the light diffusing plate must be reduced. Therefore, it is clear that the above-mentioned type of light diffusing plate is still unsatisfactory in view of the cost thereof.

To remove the above-mentioned disadvantage, Japanese Unexamined Patent Publication (Kokai) No. 61-55684 discloses an improved type of light diffusing device comprising a base plate composed essentially of a transparent light transmitting layer corresponding to a substantially major portion of the plate, a light diffusing layer formed on at least a front surface of the transparent light transmitting layer, and an intermediate layer formed between the transparent light transmitting layer and the light diffusing layer and having intermediate light transmitting and diffusing properties between those of the light transmitting and diffusing layers, at least one edge face of the base plate being a light incident face; and a light reflecting face layer formed on a rear surface of the base plate.

The above-described light diffusing device is significantly advantageous in cost for producing the device.

However, in view of the recent demand for a display on a large screen having a size of 10 to 14 inches, there is an increased demand for the provision of an even further increased uniformity (evenness) in brightness over the entire surface of such a large screen.

Japanese Unexamined Utility Model Publication (Kokai) No. 61-104,490 discloses a new type of light diffusing device wherein a light diffusing plate is arranged on the above-mentioned base plate to improve the uniformity of the brightness thereof.

In the above-mentioned type of light diffusing device wherein light is introduced from a light source into the device through at least one edge face of a transparent light transmitting layer, there is a problem in that a brightness at a location close to the light incident edge face is different from that at another location far from the light incident edge face. Therefore, it is strongly desired to increase the uniformity of the brightness throughout the entire front surface of the device.

SUMMARY OF THE INVENTION

An object of the present Invention is to provide a light diffusing device useful for illuminating a relatively large display surface with a uniform brightness.

Another object of the present invention is to provide a light diffusing device having a significantly decreased optical loss.

Still another object of the present invention is to provide a light diffusing device capable of being manufactured easily and at a low cost.

The above-mentioned objects can be attained by the light diffusing device of the present invention which comprises: (1) a light source member and (2) a light diffusing member which comprises (A) a base plate comprising (a) a transparent light transmitting layer having at least one light incident edge face thereof facing the light source member, (b) a light diffusing layer formed on a front surface of the transparent light transmitting layer, (c) an intermediate layer formed between the transparent light transmitting layer and the light diffusing layer, and (d) a light reflecting surface layer formed on a rear surface of the transparent light transmitting layer; (B) a light diffusing plate superimposed over the base plate; and (C) a light reflecting film located between the light diffusing layer in the base plate and the light diffusing plate without coming into contact with them and effective for reflecting portions of light irradiated from the light diffusing layer in the base plate and for evenly distributing the irradiated light into the light diffusing plate.

DESCRIPTION OF THE PREFERRED EMBODIMENTS

The light diffusing device of the present invention comprises a light source member and a light diffusing member.

Figure 1:
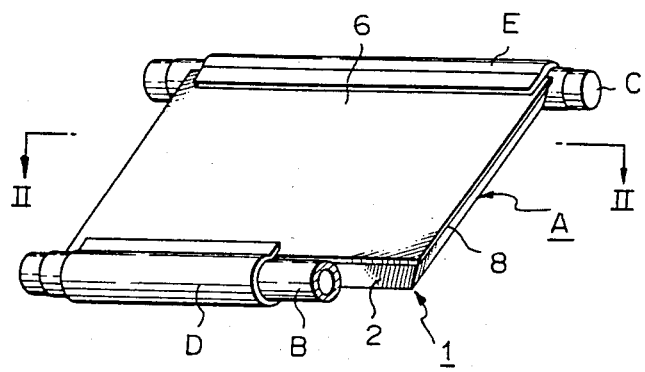
FIG. 1 is a partially notched perspective view of an embodiment of the light diffusing device of the present invention while in use.
Figure 2:
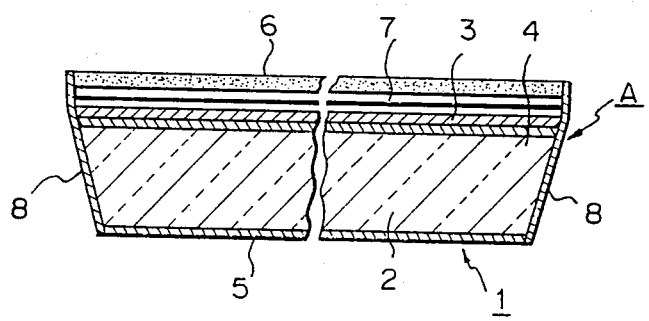
FIG. 2 is a partially notched cross-sectional view of the device indicated in FIG. 1 along the line II—II therein.

Referring to FIGS. 1 and 2, a light diffusing member A comprises a base plate 1, a light diffusing plate 6, and a light reflecting film 7 effective for evenly distributing light transmitted from the base plate 1 to the light diffusing plate 6.

The base plate 1 comprises a transparent light transmitting layer 2 which usually occupies a major portion of the volume of the base plate 1, a light diffusing layer 3 formed on a front surface (an upper surface in FIG. 1) of the transparent light transmitting layer 2, and an intermediate layer 4 formed between the transparent light transmitting layer 2 and the light diffusing layer 3. Usually, the intermediate layer 4 has light transmitting and diffusing properties in intermediate intensities between those of the transparent light transmitting layer 2 and the light diffusing layer 3.

The transparent light transmitting layer 2 has at least one light incident edge face facing a light source (lamp) in the light source member.

Preferably, a light reflecting surface layer 5 is formed on a rear surface (a lower surface in FIG. 1) of the transparent light transmitting layer.

An ordinary type light diffusing plate 6 is superimposed over the light diffusing layer 3 in the base plate 1 through a small gap. A light reflecting film 7 is interposed between the light diffusing plate 6 and the light diffusing layer 3. This light reflecting film 7 consists of a transparent substrate film and a number of light reflecting small spots or small places formed on the transparent substrate film in a pattern effective for evenly distributing the quantity of light transmitted from the base plate 1 to the light diffusing plate 6. The light reflecting film 7 is not forced into close contact or adhesion with the light diffusing plate 6 and the light diffusing layer 3 in the base plate 1. That is, the light reflecting film 7 is spaced from the light diffusing plate 6 by a very thin gap and from the light diffusing layer 3 also by a very thin gap. These very thin gaps form very thin air layers.

In FIG. 2, the gaps formed between the light diffusing plate 6 and the light reflecting film 7 and between the light reflecting film 7 and the light diffusing layer 3 are shown on an enlarged scale to give a clear indication of the arrangement of the above-mentioned plate 6, film 7, and layer 3.

In the embodiment of the light diffusing device indicated in FIG. 1, the base plate 1 the light reflecting film 7, and the light diffusing plate 6 have rectangular plane configurations similar in shape and dimensions to each other.

Figure 3:
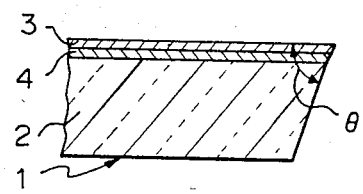
FIG. 3 is a cross-sectional view of a portion of a base plate in the light diffusing device of the present invention.

The base plate 1 has at least one light incident edge face thereof. Referring to FIG. 1, the base plate 1 has a pair of light incident edge faces facing and exposed to light sources (for instance, fluorescent lamps) B and C which are provided with reflectors D and E, respectively. Also, the base plate 1 has edge faces thereof other than the at least one light incident edge face. Preferably, the other edge faces of the base plate 1 are slanted or inclined at an acute angle $\theta$ to a front face of the base plate 1, as shown in FIG. 3.

The edge faces other than the light incident face of the base plate and the edge faces of the light diffusing plate 6 and the light reflecting film 7 are provided with light reflecting edge face layers 8 as shown in FIG. 2.

In the embodiment of the light diffusing device shown in FIG. 1, the base plate 1 has two light incident edge faces thereof facing and exposed to two light sources B and C in the light source member. However, the light diffusing member may have another type of base plate having, for example, only one light incident edge face thereof exposed to the single light source.

In the light diffusing device of the present invention, the transparent light transmitting layer usually consists of a highly transparent plastic material, for example, an alkyl methacrylate polymer sheet, especially a methyl methacrylate polymer sheet, preferably having a thickness of from 0.3 mm to 20 mm, more preferably from 3.0 to 15 mm.

The light diffusing layer usually consists of a matrix consisting of an alkyl methacrylate polymer produced by a multi-stage polymerization method and a light diffusing agent, for example, titanium dioxide fine powder, dispersed in the matrix. This type of alkyl methacrylate polymer is disclosed in U.S. Pat. Nos. 3,804,925, 4,052,523, 4,173,600 and 4,508,875.

Usually, the light diffusing layer has a thickness of from 0.05 to 1 mm.

The base plate usable for the present invention can be produced by any known method.

For example, a front surface of a methyl methacrylate polymer plate (film) is coated with a mixture of a methacrylate monomeric liquid and a light diffusing agent so as to cause the front surface of the methyl methacrylate polymer plate to be dissolved or swollen by the monomeric liquid and to allow a portion of the liquid diffusing agent to diffuse into and to be mixed with the dissolved or swollen front surface of the methyl methacrylate polymer plate. Then, the methacrylic monomeric liquid is polymerized to provide a light diffusing layer and an intermediate layer between the light diffusing layer and a transparent light transmitting layer.

Alternatively, a thin light diffusing film consisting of an alkyl methacrylate polymer containing a light diffusing agent dispersed therein is brought into contact with a layer consisting of an alkyl methacrylate monomer or syrup to cause a surface portion of the light diffusing film to be dissolved or swollen by the monomer or syrup and to allow a portion of the monomer or syrup to diffuse into the dissolved or swollen surface of the light diffusing film. Then, the monomer or syrup is polymerized, preferably under heat and pressure, to provide a transparent light transmitting layer and an intermediate layer which bonds the transparent light transmitting layer to the light diffusing film layer to form a body of a base plate. The above-mentioned method is disclosed in U.S. Pat. No. 4,415,509.

In another method for producing the base plate, surface of a light diffusing film consisting of an acrylic polymer matrix and a light diffusing agent dispersed in the matrix, and a transparent light transmitting plate consisting of a transparent methacrylic polymer, are partially dissolved or swollen and the partially dissolved or swollen surfaces are brought into contact so as to form an intermediate layer between the light transmitting layer and the light diffusing layer.

Usually, the intermediate layer is formed in a thickness of from 0.01 to 0.2 mm.

The intermediate layer is highly effective for firmly bonding the transparent light transmitting layer to the light diffusing layer and for enhancing the diffusion of light transmitted through the transparent light transmitting layer into the light diffusing layer.

The base plate usually has a flat plate-like shape and a rectangular plane configuration as shown in FIGS. 1 and 2. However, the shape and configuration of the base plate are not restricted to those mentioned above, and may be other than those shown. Also, the base plate shown in FIGS. 1 and 2 has a uniform thickness throughout the entire body of the base plate. However, the thickness of the base plate may be variable depending on the distance from each light incident edge face of the base plate. For example, the thickness may be gradually decreased from each light incident edge face facing a light source toward the center of the base plate. That is, the dimensions and shape of the base plate can be varied depending upon the intended use of the light diffusing device.

Referring to FIG. 2, the light reflecting layer 5 can be provided, for instance, by vapor depositing or plating a metal, for example, aluminum, on the rear surface of the base plate 1. Alternatively, the light reflecting surface layer 5 is formed by adhering a light reflecting tape having a light reflecting metal surface layer provided by means of a vapor deposition of a metal, for instance, aluminum on a surface of a plastic tape, to the rear surface of the base plate 1. The thickness of the light reflecting surface layer 5 is not restricted to a specific value as long as it can satisfactorily serve as a light reflector.

The light diffusing plate 6 as indicated in FIGS. 1 and 2 may consist of a conventional light diffusing plate, for example, frosted glass plate, milk white glass plate or a thermoplastic plate containing a light diffusing agent dispersed therein. Usually, the thickness of the light diffusing plate 6 is ¼ that of the base plate 1 or less.

The light reflecting film 7 is arranged between the base plate 1 and the light diffusing plate 6 for the purpose of evenly distributing the quantity of light to be transferred from the base plate 1 to the light diffusing plate 6. Usually, the quantity of light irradiated from the base plate is variable depending on the distance from the light incident edge face of the base plate. That is, the smaller the distance from the light incident edge face of the base plate to a portion thereof, the larger the quantity of light transmitted through the base plate. This phenomenon causes the distribution of brightness on the front surface of the light diffusing plate to be uneven. To make the brightness distribution uniform, it is necessary to reflect light irradiated from a portion of the base plate close to the light incident edge face toward the base plate. The amount of light to be reflected on the light reflecting film is variable depending on the distance from the light incident edge face. That is, the smaller the distance from the light incident edge face, the larger the amount of light to be reflected.

Usually, the light reflecting film comprises a transparent film substrate and a number of light reflecting small spots or small places formed on the film substrate. The size, configuration, and distribution density of the light reflecting spots are designed so that they cause the distribution of light transmitted through the light reflecting film to be uniform.

Figure 4:
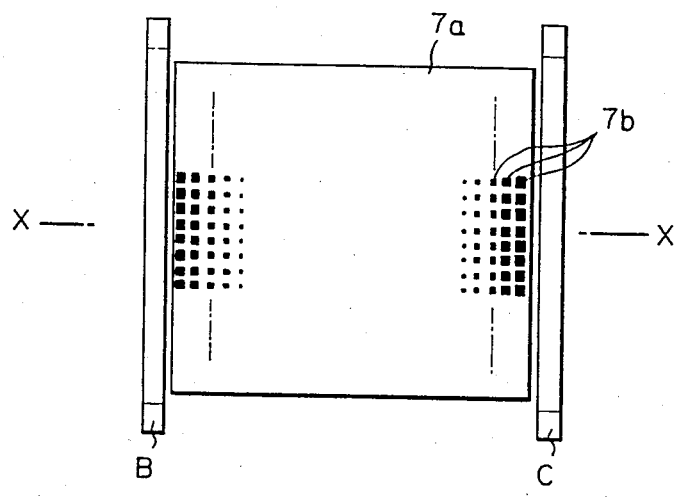
FIG. 4 is a plane view of an embodiment of the light reflecting film usable for the light diffusing device of the present invention.

Referring to FIG. 4, a light reflecting film 7 comprises a transparent film substrate 7a consisting of, for example, a transparent polyethylene terephthalate film having a thickness of 25 to 125 $\mu$m, and the light reflecting spots 7b formed on the transparent film substrate 7a.

Referring to FIG. 4, the size (area) and the distribution density of the light reflecting spots 7b decreases with an increase in the distance from the light source B or C. A total area of the spots in the light reflecting film 7 in the above-mentioned end portions thereof increases with decrease in the distance from the light source B or C. In the middle portion of the light reflecting film, the light reflecting spots are not arranged on the transparent film substrate.

Figure 5:
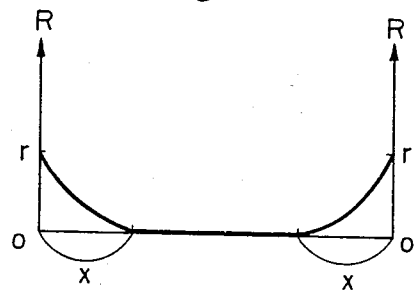
FIG. 5 is a graph showing a distribution of light reflection on a light reflecting film as shown in FIG. 4.

Referring to FIG. 5, in the end portions of the light reflecting film having a distance x from end points 0, the average reflectance (r) of the light by the transparent film decreases with an increase in the distance x. In the middle portion of the light reflecting film, light reflection does not occur.

The distance x and the average reflectance r are not restricted to specific values. However, in FIG. 5, the distance x is in the range of from 30 mm to 40 mm and the average reflectance r is in the range of from 30% to 50%.

In the device shown in FIG. 4, two light sources B and C are arranged. However, the device of the present invention may contain a single light source. In this case, the density of the light reflecting spots decreases with an increase in the distance from the single light source.

The light reflecting spots can be produced by vapor depositing a light reflecting metal, for example, aluminum, on an entire surface of a transparent film substrate and then removing (etching) portions of the vapor-deposited metal layer in accordance with a predetermined pattern.

In another method, a transparent film substrate is coated on the entire surface thereof with a paste containing a light reflecting metal and a photosensitive resin, the coatings are then masked in accordance with a predetermined pattern and are exposed to light. Thereafter, the exposed portions or unexposed portions of the coating layer are removed.

The pattern of the light reflecting spots is not limited to that shown in FIG. 4 and may be striped or checkered.

The size of the light reflecting spots may vary with the distance from the light source, as shown in FIG. 5. Also, the light reflecting spots having the same size may be distributed at a different distribution density on the transparent film substrate.

The light reflecting film may have a continuous light reflectance distribution as shown in FIG. 5.

Referring to FIGS. 1 and 2, the light reflecting edge face layers 8 are provided with an irregular reflection surface having a high reflectance. Usually, the light reflecting edge face layers 7 are made of a retroreflection tape.

As shown in FIGS. 2 and 3, the light reflecting edge face layers 8 are preferably slanted or inclined at an acute angle $\theta$ to the front surface of the base plate 1. The angle $\theta$ is preferably in the range of from 75 to 88 degrees. The slanted light reflecting edge face layers 8 are effective for enhancing the uniformity of the brightness of the light diffusing layer surface of the base plate.

The light source member of the present invention usually has one or two light sources, for example, tube-shaped fluorescent lamps, as shown in FIG. 1. The light source preferably has a cross-sectional profile as shown in FIG. 6.

Figure 6:
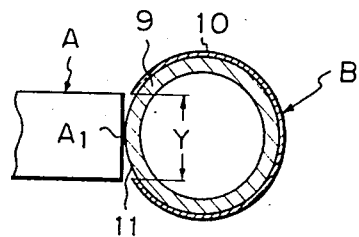
FIG. 6 shows a cross-sectional view of an embodiment of the light source member usable for the light diffusing device of the present invention.

In FIG. 6, a tube-shaped light source 9, for example, a tube-shaped fluorescent lamp is covered by a light reflector 10 having a slit 11 extending along the longitudinal axis of the tube-shaped light source 9 and having a width Y shown in FIG. 6. The slit 11 of the light reflector 10 is located in such a manner that the light incident edge face of the base plate faces the tube-shaped light source 10 through the slit 11. The width Y of the slit is preferably similar to the height of the light incident edge face of the base plate.

The light reflector 10 is preferably made of a light-reflecting film or sheet consisting of a transparent film substrate consisting of, for example, a transparent polyethylene terephthalate film or a transparent polypropylene film, a light reflecting metal layer formed on a surface of the film substrate by means of a metal vapor depositing, and a top coating layer consisting of, for example, a polyurethane resin, and formed on the opposite surface of the film substrate.

In another embodiment, the light reflector 10 consists of, for example, a composite sheet consisting of a metal reflecting metal foil, for example, an aluminum foil, and two transparent plastic layers consisting of a polyester resin or polypropylene resin and formed on both surfaces of the metal foil.

In still another embodiment, the light reflector 10 consists of a composite sheet composed of a light reflecting metal foil, a transparent plastic film laminated on a surface of the metal foil and a top coating layer consisting of, for example, a polyurethane resin laminated on the other surface of the metal foil.

The light reflector 10 preferably has a light reflectance of about 80% or more and is capable of resisting a temperature of 100° C. or more.

In the preparation of the light source as indicated in FIG. 6, a light reflecting sheet is cut to provide a preparatory sheet having a length similar to the length of the light source to be covered and a width corresponding to a length adequate to form a slit 11 having a width Y, which is the same as the height $A_1$ of the light incident edge face A, when the preparatory sheet is wound on the peripheral surface of the light source B, and the preparatory sheet is wound on the light source B so as to form the slit 11 facing the light incident edge face A. The light reflector 10 is adhered to the peripheral surface of the light source B with an adhesive tape or an adhesive agent.

The light reflector 10 indicated in FIG. 6 is made of a material in the form of a film. However, the form of the light reflector is not limited to the film, and may be in another form, for example, a sheet, as long as the material for the light reflector 10 has a satisfactory light reflectance, and an adequate flexibility and formability for winding it around the light source.

In the light diffusing device of the present invention, the tube-shaped light source is not limited to a tube-shaped fluorescent lamp, and may be selected from other luminescent lamps and incandescent lamps in a tube shape.

Referring to FIGS. 1, 2 and 4, when the light sources (fluorescent lamp) B and C are lit, the irradiated light is introduced into the transparent light transmitting layer 2 through the light incident edge face thereof facing the light sources. The introduced light, portions of which are reflected by the light reflecting surface layer 5 and by the light reflecting edge face layer 8 and returned into the transparent light transmitting layer 2, are transmitted to the light diffusing layer 3 through the intermediate layer 4. The light is diffused by the light diffusing layer 3 and is irradiated to the light diffusing plate 6 through the light reflecting film 7.

When the diffused light is irradiated from the light diffusing layer 3, a portion of the irradiated light from an end portion of the light diffusing layer 3 (close to the light incident edge face of the transparent light transmitting layer 2) is reflected by the light reflecting spots 7b in the light reflecting film 7, returned into the light diffusing layer 3 and then irradiated from another portion of the light diffusing layer 3 far from the light incident edge face. Accordingly, the diffused light is evenly introduced from the light diffusing layer 3 into the light diffusing plate 6 through the light reflecting film 7.

The introduced light is evenly diffused in the light diffusing plate 6 and evenly irradiated to the outside of the device.

The light diffusing device of the present invention provides a highly uniform illumination with evenly scattered light at a reduced optical loss. That is, the light diffusing device of the present invention is extremely useful for a large size display system.

The present invention will be more fully explained by means of examples, but it should be understood that these are merely representative and do not restrict the scope of the present invention in any way.

EXAMPLE 1

(1) Production of Base Plate

A rutile type titanium oxide powder in amount of 1.5% by weight was dry blended with 98.5% by weight of acrylic resin pellets consisting of a methylmethacrylate-butylacrylate copolymer ("Hipet", registered trade mark, made by Mitsubishi Rayon Co.). The blend was subjected to an ordinary process for producing an acrylic resin film having a thickness of 50 μm.

The film was spread on an inorganic glass plate and temporarily adhered thereto with a methyl methacrylate adhesive. Spacers were placed on edge portions of the film and another glass plate was place on the spacers to produce a cell formed by the two glass plates facing each other through the spacers. The film was located within the resultant cell. The cell had a gap having a thickness of about 10 mm and formed between the two glass plates.

A syrup consisting of partially polymerized methyl methacrylate was poured into the gap and polymerized to provide a transparent acrylic resin plate having a thickness of about 10 mm.

When the syrup was brought into contact with the titanium dioxide-containing acrylic resin film, a surface of the film was partially dissolved or swollen to allow a portion of the syrup to diffuse into the surface of the film and to form an intermediate layer between the transparent acrylic resin plate and the titanium dioxide-containing acrylic resin film.

A light reflecting layer was formed in a thickness of about 1000 angstrom by means of a vacuum vapor deposition of aluminum on a rear surface opposite to the front surface of the acrylic resin plate.

The resultant composite plate was cut into a rectangular piece having a length of 200 mm and a width of 100 mm. That is, the piece had a pair of longitudinal edge faces having a length of 200 mm and a pair of transverse edge faces having a length of 180 mm. The two longitudinal edge faces were flame polished, and the two transverse edge faces were cut to form slanted edge faces inclined at an angle $\theta$ of about 82 degrees to the front surface of the piece. Thus, a base plate provided with the light reflecting surface layer formed on the rear surface of the base plate was obtained.

(2) Production of Light Reflecting Film

A metal image-forming negative-positive type photosensitive film laminate ("K.D.P.", registered trade mark, made by Kimoto Co.) having dimensions of 200 mm×100 mm and consisting of a polyethylene terephthalate film substrate having a thickness of about 100 $\mu$m, an aluminum foil layer formed on the film substrate, a photosensitive resin layer placed on the foil layer, an adhesive layer coated on the resin layer and a transparent cover film layer placed on the adhesive layer, was used as a material for the light reflecting film.

The photosensitive resin layer was exposed through the cover film to light in accordance with a predetermined masking pattern and was developed by an ordinary method for the K.D.P film laminate.

The resultant light reflecting film had a number of light reflecting metal spots in the pattern as shown in FIG. 4. In the light reflecting film, the light reflecting metal spots having a square form are arranged in longitudinal and transverse densities of 30 square layers/inch. Referring to FIG. 5, the light reflecting film exhibited a maximum light reflectance r of 40% and a distance X of 40 mm.

(3) Preparation of Light Diffusing Plate

A milk white light diffusing plate ("Acrylite #432", registered trade mark, made by Mitsubishi Rayon Co.) was cut into a rectangular piece having dimensions of 200 mm×180 mm.

(4) Assembling of Light Diffusing Device

The rectangular light reflecting film was superimposed on the front surface of the rectangular base plate and the rectangular light diffusing plate was superimposed on the light reflecting film in such a manner that the light reflecting spots in the light reflecting film face the front surface of the base plate and are not in direct contact with each other.

The base plate, the light reflecting film and the light diffusing plate were integrated into one body by applying a double surface adhesive tape to each of the transverse edge faces of the base plate, light reflecting film and light diffusing plate.

A recurring reflection sheet ("Sparklite", registered trade mark, made by Unichika Co.) having a vapor deposited aluminum layer was applied to the double surface adhesive tape layer on the integrated structure in such a manner that a surface of the vapor deposited aluminum layer came into contact with the adhesive tape. Thus, a light diffusing member was obtained.

(5) Combining of Light Sources

Two tube-shaped fluorescent lamps ("FL-6W", trade mark, made by Toshiba Ltd.) having a diameter of 15 mm, a length of 210 mm and an output of 6 W were arranged in vicinity of the longitudinal edge faces of the base plate. The outer surfaces of the fluorescent lamps were covered by light reflectors consisting of aluminum plate, except for portions of the outer surface facing the longitudinal edge faces.

The resultant light diffusing device had the construction as shown in FIGS. 1, 2 and 4.

When the fluorescent lamps were lit, and light diffusion on the light diffusing plate was observed by the naked eye, it was found that the light was evenly diffused and irradiated.

The brightness on the light diffusing plate was measured in the following manner. That is, the front surface of the light diffusing member was partitioned into 20 sections as shown in FIG. 7.

The brightnesses in cd/m$^2$ at the center points of the sections were measured by means of a brightness meter (nt 1 degree, made by MINOLTA CO.).

Figure 7:
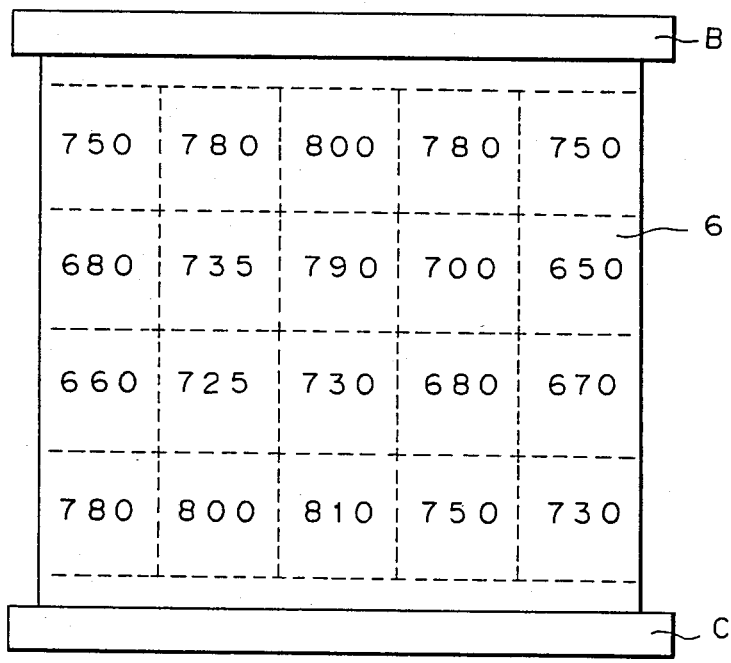
FIG. 7 shows a distribution of brightness on the light diffusing plate in the light diffusing device described in Example 1.

The results are shown in FIG. 7. The average value of the measured 20 brightnesses was 735 dd/m$^2$. The brightnesses in the 20 sections are similar to each other. In the observation of the light diffusing surface of the light diffusing plate by the naked eye, no specific mark corresponding to the light reflecting layers was found in the light irradiation on the light diffusing surface.

EXAMPLE 2

The same procedures as those described in Example 1 were carried out except that tube-shaped fluorescent lamps (FL-6W, 100 V, 6 W) were lit by a stabilized 100 V AC current source, and the lamps were covered by a light reflecting sheet having dimensions of 200 mm×38.7 mm and consisting of a polyester film substrate having a thickness of about 70 $\mu$m and a light reflecting aluminum layer formed by means of a vapor depositing. The light reflecting sheets were wound around the outer surfaces of the lamps so as to form slits facing the light incident edge faces of the base plate.

The ends of the wound light reflecting sheet were placed on the ends of the lamps, and fixed thereto by means of transparent adhesive tapes.

The resultant light sources had a construction as shown in FIG. 6. The width Y of the slit was about 10 mm.

The front surface of the resultant light diffusing device was partitioned into 10 sections. In each section, a brightness was measured by means of a brightness meter (nt $\frac{1}{3}$ degrees) made by MINOLTA CO.

The results are shown below.

TABLE 1

| Section No. | 1 | 2 | 3 | 4 | 5 | 6 | 7 | 8 | 9 | 10 |
|---|---|---|---|---|---|---|---|---|---|---|
| Brightness (cd/m$^2$) | 6,420 | 16,000 | 21,300 | 23,000 | 23,600 | 23,600 | 22,800 | 19,200 | 11,800 | 4,460 |

I claim:

1. A light diffusing device comprising (1) a light source member and (2) a light diffusing member which comprises (A) a base plate comprising (a) a transparent light transmitting layer having at least one light incident edge face thereof facing the light source member, (b) a light diffusing layer formed on a front surface of the transparent light transmitting layer, (c) an intermediate layer formed between the transparent light transmitting layer and the light diffusing layer and (d) a light reflecting surface layer formed on a rear surface of the transparent light transmitting layer; (B) a light diffusing plate superimposed over the base plate; and (C) a light reflecting film located between the light diffusing layer in the base plate and the light diffusion plate without being in contact therewith, and consisting of a transparent film substrate and light reflecting spots formed thereon in a pattern effective for reflecting portions of light irradiated from the light diffusing layer in such a manner that the amount of the light reflected by the light reflecting film decreases with an increase in distance from the light incident edge face, and thus the quantity of the light transmitted from the base plate to the light diffusing plate through the light reflecting film is evenly distributed.

2. The light diffusing device as claimed in claim 1, wherein the light diffusing member further comprises light reflecting edge face layers formed on edge surfaces of the base plate except for at least one light incident edge face of the base plate and on the edge faces of the light reflecting film and light diffusing plate.

3. The light diffusing device as claimed in claim 1, wherein the light reflecting edge face layers are inclined at an acute angle $\theta$ to a front surface of the base plate.

4. The light diffusing device as claimed in claim 1, wherein the light source member has one or two tube-shaped lamps.

5. The light diffusing device as claimed in claim 4, wherein each tube-shaped lamp is covered with a flexible light reflecting sheet having a slit formed therein and facing the light incident edge face of the transparent light transmitting layer.

6. The light diffusing device as claimed in claim 1, wherein the transparent light transmitting layer predominates in volume in the base plate.

7. The light diffusing device as claimed in claim 1, wherein the intermediate layer has a light transmitting property and a light diffusing property in intermediate intensities between those of the transparent light transmitting layer and the light diffusing layer.

* * * * *